United States Patent [19]
Jaggard

[11] 3,801,375
[45] Apr. 2, 1974

[54] ASSEMBLYING ELECTRODES IN ELECTROCHEMICAL CELLS

[75] Inventor: Arthur M. Jaggard, Apple Valley, Minn.

[73] Assignee: Gould Inc., Mendota Heights, Minn.

[22] Filed: Feb. 25, 1972

[21] Appl. No.: 229,274

[52] U.S. Cl. ............................ 136/135 R, 136/175
[51] Int. Cl. ............................................. H01m 5/00
[58] Field of Search............ 136/134, 135, 175–176, 136/107, 111, 86 A

[56] References Cited
UNITED STATES PATENTS

| | | |
|---|---|---|
| 2,713,602 | 7/1955 | Shuman, Jr. ........................ 136/111 |
| 3,245,837 | 4/1966 | Ikeda et al. ...................... 136/134 P |
| 3,576,678 | 4/1971 | Kocherginsky et al. ............ 136/107 |
| 2,993,947 | 7/1961 | Leger .................................. 136/107 |
| 3,161,546 | 12/1964 | Yeager et al. ..................... 136/86 A |
| 3,436,270 | 4/1969 | Oswin et al. ....................... 136/86 A |

*Primary Examiner*—Anthony Skapars
*Attorney, Agent, or Firm*—Jacobson and Johnson

[57] ABSTRACT

A process for forming electrode leads through a cell housing by inserting of a unitary cathode pin through the housing so that the cathode pin simultaneously functions as a low resistance electrical contact with a collector screen and as an external cell terminal. Another process of the invention is the inserting of a unitary anode pin through the cell housing so that the anode pin simultaneously functions as an external cell terminal and an internal current collector.

17 Claims, 7 Drawing Figures

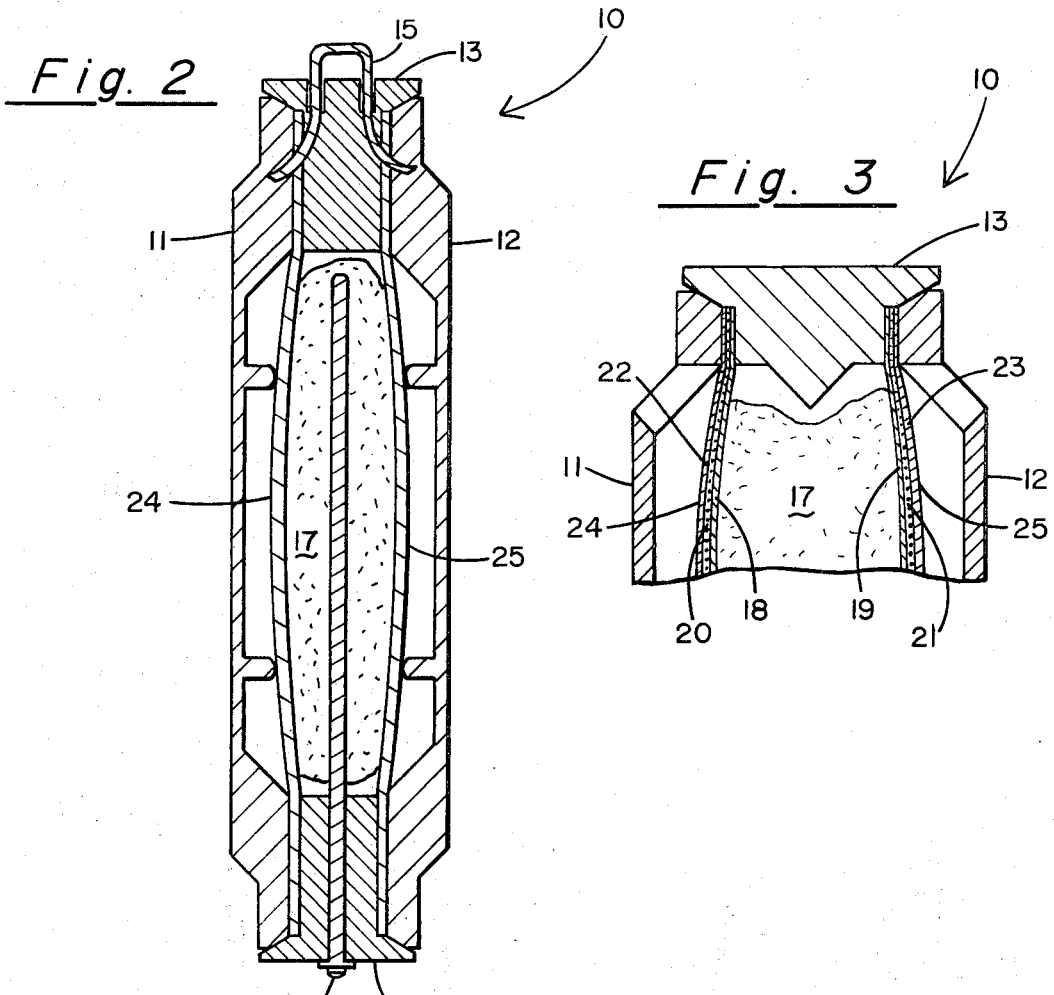
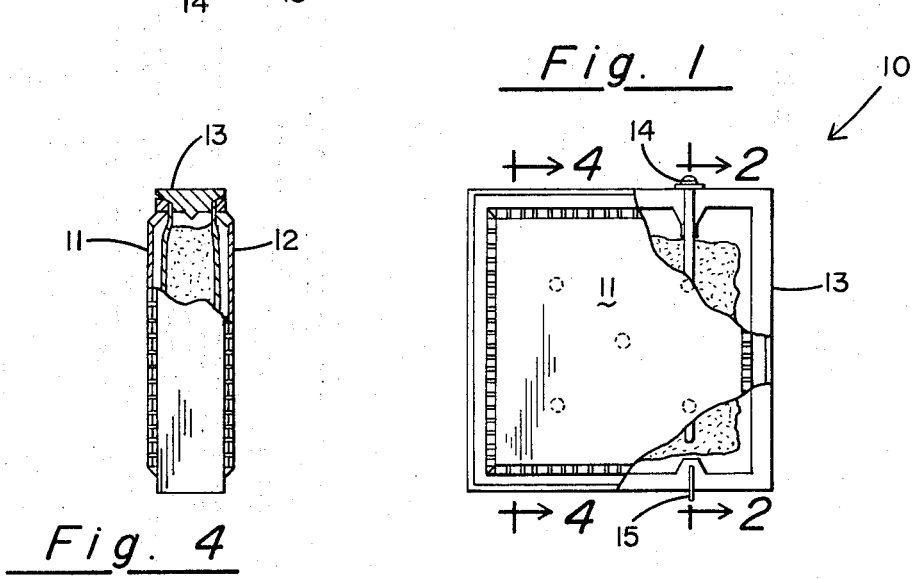

PATENTED APR 2 1974 3,801,375

ASSEMBLYING ELECTRODES IN ELECTROCHEMICAL CELLS

BACKGROUND OF THE INVENTION

FIELD OF THE INVENTION

This invention relates generally to assembly of electrochemical cells and, more particularly, to the assembly of electrode leads through the cell housing. In the manufacture of prior art cells and particularly in the manufacture of metal air cells, one of the problems has been the difficulty in making an electrode lead to carry the current from the interior of the metal air cell to the exterior of the metal air cell. One of the prior art techniques for extending an electrode lead from the interior of the cell or battery to the exterior of the cell or battery has been to extend a collector screen through the housing and then form an external electrical contact by welding a conductor to the screen.

Another method is to form an external electrical contact by crimping a conductor or contact to the collector screen. While these assembly procedures are satisfactory for certain applications, these techniques are generally not conducive to the aesthetic and functional requirements of most metal air cells, nor are these methods suitable for low cost mass production assembly of metal air cells.

Still another prior art method shown for forming an electrical contact in a metal air cell is depicted in the Oswin U.S. Pat. No. 3,479,226. Oswin utilizes an anode pin that contacts a screen located within the matrix of the anode. However, the Oswin anode pin differs from the present invention in that Oswin has a two-piece anode electrode, i.e., the first piece is the anode pin which projects into the housing to form contact with the second piece which is the internal current collector. The present invention, in contrast, utilizes a one-piece anode pin which simultaneously functions as a current collector and an external contact or terminal. Thus, the anode pin of the present invention eliminates an internal anode collector screen by utilizing an assembly process that requires inserting a one-piece anode pin into the housing to simultaneously function as an external contact and a current collector.

Still another feature of the invention is a process of making a cathode terminal and a low resistance electrical contact with a collector screen by utilizing a unitary cathode pin. One inserts the cathode pin through the cell housing of an assembled cell to simultaneously form an external battery terminal and a low resistance electrical connection with the cathode collector screens located on the interior of the metal air cell. Thus, this particular battery avoids the use of any welding or crimping of the electrodes thereby providing neat, efficient electrode connections. Furthermore, the process enables one to make the cathode connections after the cell has been completely assembled.

Another feature of the present invention is the method of inserting the anode and cathode pin through the housing by melting the housing.

SUMMARY OF THE INVENTION

Briefly, one embodiment of the invention is a process which utilizes a cathode pin that functions as a low resistance electrical connector and as an external battery terminal. Another embodiment of the invention comprises a process for forming electrical connections through the housing of an electrochemical cell by utilizing a one-piece anode pin that functions as an external battery terminal and as an internal current collector.

BRIEF DESCRIPTION OF THE DRAWING

FIG. 1 is a front elevational view partially in section of a metal air battery showing one embodiment of a cell assembled by my process;

FIG. 2 is a sectional view taken along lines 2—2 of FIG. 1;

FIG. 3 is an enlarged partial sectional view taken along the lines 4—4 of FIG. 1 showing the details of the housing and cathode assemblies;

FIG. 4 is a partial cut away end view showing the appearance of the cell;

DESCRIPTION OF THE PREFERRED EMBODIMENT

Figure 5:
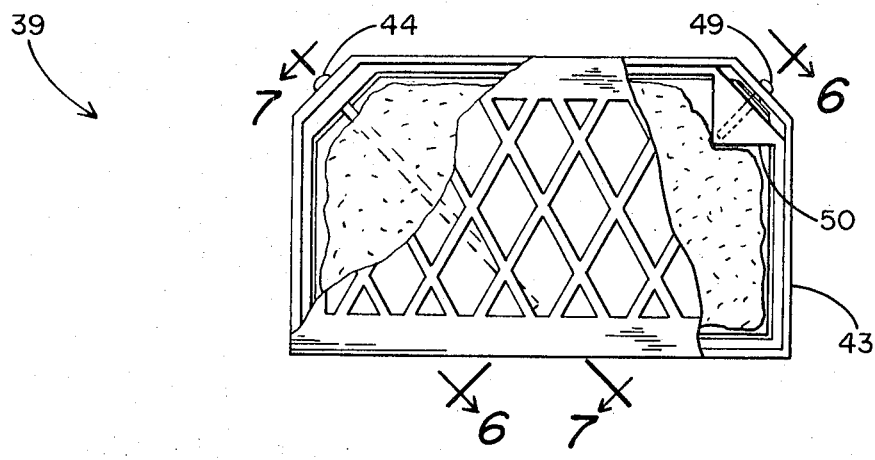
FIG. 5 is a front elevation view, partially in section, showing another cell assembled by my process.

Referring to the drawing, reference numeral 10 generally designates a metal air cell containing electrode pins assembled by the process of this invention. Metal air cell 10 comprises a pair of side members 11 and 12 which form mating and sealing engagement with a square shaped housing 13. Located in housing 13 are an anode pin 14 and a cathode pin 15. Typically, housing 13 and side member 11 and 12 are made from a polymer such as acrylonitrile-butadiene-styrene or polystyrene. However, no limitation is intended thereto as other polymers well known in the art can also be used. Similarly, anode pin 14 and cathode pin 15 are made from a material such as brass and then plated with silver, however, no limitation is intended thereto as materials for collectors are well known in the art.

In order to more clearly illustrate the details of metal air cell 10, reference should be made to FIGS. 2 and 3 which show in detail the internal structure of cell 10. Referring to FIG. 3, cell 10 is shown comprising an anode 17 which, for example, may be zinc. Located on the sides of anode 17 are a pair of separators 18 and 19. Located adjacent separators 18 and 19 are a pair of cathode collector screens 20 and 21. Cathode screens 20 and 21 typically contain a cathode material such as carbon black, a catalyst and a hydrophobic binder dispersed throughout the screen. Located adjacent to collector screens 20 and 21 are a pair of hydrophobic membranes 22 and 23 which allow air to enter the cell but prevent the cathode from leaking. The separator, collector screens and the hydrophobic membranes on each side of anode 17 are sandwiched together in a first cathode assembly 24 and a second cathode assembly 25. First cathode assembly 24 is firmly held between housing 13 and side members 11. Similarly, second cathode assembly 25 is firmly held between housing 13 and side member 12.

In the process of assembling the anode pin in the cell a cathode assembly is placed in housing 13. Then one of the mating members is placed over the cathode assembly and sealed to produce a partially assembled cell. The sides of this partially assembled cell now define an anode region which can receive an anode. One can then place anode pin 14 through housing 13 and into the anode region defined by housing 13 and the cathode assembly. Typically, anode pin 14 can be inserted through housing 13 by first forming an opening in housing 13 which is a few thousandths of an inch smaller in diameter than the diameter of the anode pin (i.e., an interference fit). Next, the anode pin is forced through the opening by either applying an ultrasonic signal to the pin which causes the anode pin to melt through the plastic housing or by conduction heating the pin which also allows the pin to melt through the plastic housing. In either event, upon cooling, the pin and housing form a firm junction. In still another process of the invention, one can mold anode pin 14 directly into housing 13 thus avoiding the necessity of melting the pin through the housing. Next, one fills the anode region defined by housing 13 and the cathode assembly with the anode material. Next, the remaining cathode assembly and remaining mating side member are placed on the housing to produce a partially assembled cell.

Referring to FIGS. 2 and 3, cell 10 is shown in cross section thus revealing the interior of the cell after side members 11 and 12 are mated with housing 13.

In the preferred embodiment, anode 17 is preferably made from zinc or amalgamated zinc powder; however no limitation to the materials in the anode is intended. FIGS. 1 and 2 show the zinc anode held within the confines of the cell by cathode assembly 24 and cathode assembly 25 which are firmly held between side members 11 and 12 and housing 13.

Next, the collector screens 20 and 21 are electrically connected to an external terminal which has a portion that projects through cell housing 13. Located in the top of housing 13 and extending partially through housing 13 is one form of a cathode contact or terminal 15. Cathode contact 15 comprises a U-shaped member that simultaneously forms an external cell contact or terminal and a low resistance electrical connection with cathode collector screens 20 and 21.

Typically, contact 15 comprises a U-shaped member or staple which is inserted through a pair of openings in housing 13. When inserting contact 15, the ends of the contact bend or diverge outward as one forces the staple into housing 13. This diverging of the ends of staple 15 can be accomplished in a number of ways. One way is to provide a curved or pointed end to staple 15 which causes the ends of the staple to diverge outward. Another way is to place diverging openings in housing 13. In the preferred process of inserting staple 15 into housing 13, two openings are formed in housing 13 to guide the staple as it is inserted. Then the staple is either heated or connected to an ultrasonic source to force it through housing 13. With an ultrasonic signal applied to contact 15, it allows the staple to melt the plastic immediately adjacent the staple and thereby allows contact 15 to penetrate into housing 13 and at the same time cause the ends of contact 15 to diverge outward and pierce cathode screens 20 and 21. Thus, it is apparent the utilization of my U-shaped contact allows one to greatly simplify the manufacture of cathode connections to a metal air cell as well as to produce a neat appearing cell. While U-shaped member 15 pierces the cathode screen by diverging the legs of the U-shaped members outward, it is also possible to use a U-shaped member that has an opening wider than assembled cell. In this embodiment, one crimps or forces the ends of the U-shaped member inward through the mating members to form a low resistance electrical connection with the collector screens.

In still another variation of the process, I insert a straight cathode pin perpendicularly through member 11, cathode assembly 24, housing 13, and cathode assembly 25 rather than through the top of housing 13. In the process, the pin forms a low resistance electrical connection with both the collector screens.

Thus, one of the unique aspects of my cathode pin is that I can insert the cathode pin into the cell after the cell has been completely assembled. While it is not entirely understood why I can produce a satisfactory low resistance electrical connection between the pin and the collector screen without the aid of welding or pressure clamping, it is believed that the portions of the cathode pin that project through the opening in the cathode screen expand the openings in the screen slightly thus producing a resilient force between the screen and pin. This resilient force holds the screen in pressure contact with the cathode pin to produce a low resistance electrical connection therebetween. It is believed that the low resistance electrical connection can be achieved in at least two embodiments. In one embodiment, a cathode pin which has a section to project through the cathode screen contains a dimension larger than the openings in the collector screen. With the cathode pin having a dimension larger than the openings in the collector screen one is assured of a low resistance electrical connection between the cathode pin and the screen. Preferably, the cathode pin is inserted perpendicularly through the collector screen which produces a low resistance electrical connection between the collector screen and the cathode pin, but as long as the cathode pin projects through the screen one can obtain a low resistance electrical connection without the aid of welding or clamping. However, the best results have been obtained when the cathode pin is inserted at about a right angle to the collector screen. In another process the cathode pin can have a dimension smaller or equal to the openings in the screen. It is believed that the low resistance electrical connection is formed between the cathode pin and the collector screen in this embodiment by the cathode pin entering the opening of the screen at an off center position which causes the contact to be forced against a portion of the collector screen. Also, if the cathode pin enters the screen at an acute angle this produces an expanding or forcing of the pin against the screen, thus producing a low resistance electrical connection between the cathode pin and the screen. However, it should be pointed out that the present invention does not place the pin parallel to the connector screen to produce a low resistance electrical contact as this requires additional steps such as welding or pressure clamping the cathode pin to the housing. Instead, the cathode pin projects at least part way through the collector screen and preferably at about a right angle to produce a low resistance electrical connection between the cathode pin and the current collector screen. While the term low resistance electrical connection has been used to describe the connection between the screen and the cathode pin, it should be pointed out that there is no specific resistance value that must be maintained. Instead, the resistance should not be so high as to have an appreciable effect on the power output of the cell in its particular application.

Figure 6:
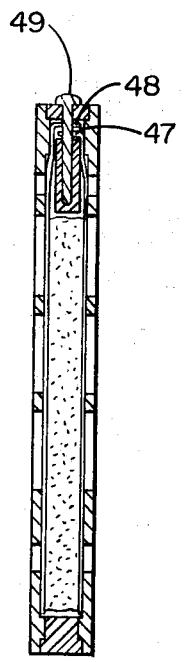
FIG. 6 is a sectional view taken along lines 6—6 of FIG. 5.
Figure 7:
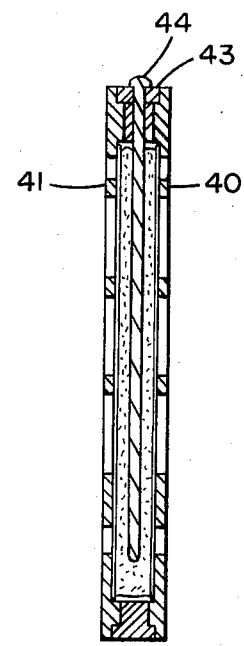
FIG. 7 is a sectional view taken along lines 7—7 of FIG. 5.

Referring to FIGS. 5, 6 and 7, reference numeral 39 designates an alternate structure or embodiment of a zinc air cell. Typically, cell 39 comprises the same operational feature in terms of anode assembly, cathode, and electrolyte. However, the cathode pin of cell 39 differs from the cathode pin shown in FIG. 2. Briefly, cell 39 comprises a pair of side sections 40 and 41 and a housing 43 that completely encircles cell 39. Side sections 40 and 41 are mated and fastened to housing 43 through assembly techniques such as ultrasonic welding or solvent sealing. An anode pin 44 which is identical to previously described electrode pin 14 is located in cell housing 43. The portion of anode pin 44 in the zinc anode functions as a current collector while the portion of anode pin 44 on the outside of housing 43 functions as a battery lead or contact. In this process anode pin 44 extends at an angle into the rectangular anode so that it is exposed to and in electrical contact with a substantial portion of the anode material.

Referring to FIG. 5 and FIG. 6, the details of the junction between a cathode pin 49 and current collector screens 47 and 48 are shown in greater detail. Typically, the corners of metal collector screens 47 and 48 which comprise part of the cathode assembly, extend from the interior of the cell to an intermediate region located in cell housing 43. As shown in FIG. 6, the corners of collector screens 47 and 48 are bent to form a 90° angle with the collector screen. With the corners of cathode screens 47 and 48 located at a 90° angle to one another produces corners that fold over one another. With the corners overlapping, a single electrode pin can be inserted through housing 43 to form a low resistance electrical connection with screens 47 and 48. Note, cathode pin 49 extends through housing 43 and into a section 50 which is part of housing 43. Thus, while cathode pin 49 projects through cathode screens 48 and 49, it does not project into the anode and short circuit the cell.

In the embodiment shown in FIGS. 5, 6 and 7, both the anode pin and the cathode pin are straight, unitary, single-piece pins which are inserted into the interior of the cell by either forcing the electrode pin through openings in the cell housing or applying an ultrasonic signal to the electrode pin to melt the pin through the housing. While the pins shown have a circular cross section, it is to be understood that square, irregular, or other cross-sectional shapes are also suitable for use with this invention.

In order to produce an effective cell, I have found one should extend the anode collector pin at least approximately half way into the anode material. Some regions of the anode are quite remote from the anode collector pin thus if the anode pin extends less than about half way, the effectiveness of the cell is reduced. Similarly, it is preferable to centrally locate the anode current collector pin, but this is not necessary if the collector pin extends at least about half way into the anode.

It should be pointed out that while the anode materials acts as its own current collector for most applications, it is still necessary to have an anode current collector pin extend at least about half way into the anode.

While the preferred embodiment shows a current collector in the form of a screen, it should be understood that other current conductivity configurations such as perforated metal foil, carbon or the like, can be used as a current collecting member. With these embodiments, the cathode pin can also pierce the current collecting member to produce a low resistance electrical connection. In the latter case, the contact between the cathode pin and the current conducting member will produce a low resistance electrical connection.

I claim:

1. A process for assemblying a cathode in an electrochemical cell comprising:
   forming a cell housing for receiving an anode and a cathode;
   forming a first cathode with a current collecting member therein;
   assemblying the cathode in the housing of the cell;
   then inserting a cathode pin through the cell housing and the current collecting member to thereby produce a low resistance electrical connection between the current collecting member and the cathode pin.

2. The invention of claim 1 wherein the cathode pin is inserted through the current collecting member at an acute angle.

3. The invention of claim 1 wherein the cathode pin is inserted through the current collecting member at about a right angle.

4. The invention of claim 1 wherein the current collecting member is formed in the shape of a screen.

5. The invention of claim 1 including inserting an anode pin of unitary construction into the cell housing for receiving an anode.

6. The invention of claim 4 wherein the process includes placing a second cathode with a current collecting screen therein.

7. The invention of claim 6 wherein the process includes inserting a cathode pin through the current collecting screen in the first cathode and the current collecting screen in the second cathode.

8. The invention of claim 6 wherein the process includes inserting a U-shaped cathode pin through the current collecting screen of the first cathode and the current collecting screen of the second cathode.

9. The invention of claim 6 wherein the process includes inserting a unitary straight cathode pin through the current collecting screen of the first cathode and the current collecting screen of the second cathode.

10. The invention of claim 7 wherein the minimum dimension of the cathode pin exceeds the maximum opening in the collector screen to thereby force the collector screen apart when inserting the cathode pin therethrough.

11. A process for making an electrochemical cell for the generation of electricity comprising:
    forming a cell housing with a region having predetermined length therein for receiving an anode;
    placing a cathode in said cell housing;
    inserting an anode pin of unitary construction at least half of the length into the region of the cell housing to act as a current collector and leaving a portion of the anode pin outside the cell housing to function as an external cell contact;
    placing anode material in the region so that the anode pin is operable to simultaneously function as an external cell terminal and an internal current collector.

12. The process of claim 11 including the step of molding the anode pin into the housing.

13. The process of claim 11 including forming an opening in the battery housing and inserting an anode pin therein.

14. The process of claim 13 including inserting the anode pin into the housing by applying an ultrasonic signal to the anode pin.

15. The process of claim 11 including forming a opening in the housing and inserting a cathode pin therein to form a low resistance electrical connection with the cathode.

16. The process of claim 15 including inserting a U-shaped cathode pin for forming a low resistance electrical connection with the cathode.

17. A cell for the generation of electricity comprising:
   a cell housing having a region of predetermined length therein;
   an anode located in the region of the housing;
   a first cathode including a first current collecting member located in said housing, said first current collecting member having openings of predetermined size therein;
   a second cathode including a second current collecting member located in said housing, said second current collecting member having openings of predetermined size therein, said first cathode and said second cathode located in a spaced relationship in said housing;
   a U-shaped cathode contact having a first end for projecting through said first current collecting member and a second end for projecting through said second current collecting member; said first end and said second end having a dimension larger than the openings of predetermined size in said first current collecting member and said second current collecting member so that said first end makes pressure contact with the openings in said first current collecting member and said second end makes pressure contact with the openings in said second current collecting member to thereby produce a low resistance electrical connection between said U-shaped cathode contact and said first current collecting member and said second current collecting member;
   an electrolyte located in said cell housing and in operable relation with said anode and said first cathode and said second cathode; and
   an anode member of unitary construction that extends into the anode region of at least about half of the length of the region to function as an anode current collector, said anode member having a terminal thereon that is external to said cell housing to thereby function as an external anode battery contact.

* * * * *